United States Patent
Krause et al.

(10) Patent No.: US 7,681,820 B2
(45) Date of Patent: Mar. 23, 2010

(54) METHOD AND DEVICE FOR THE DISINTEGRATION OF ESPECIALLY INORGANIC MATERIALS

(75) Inventors: Peter Krause, Grosskarolinenfeld (DE); Alfred Baron, Munich (DE); Georg Hilger, Ostermuenchen (DE); Walter Menzel, Dueren (DE); Ulf Pahnke, Starnberg (DE); Rainer Krenski, Staudach-Egerndach (DE)

(73) Assignee: Krause Maschinenbau GmbH, Tuntenhausen (DE)

( * ) Notice: Subject to any disclaimer, the term of this patent is extended or adjusted under 35 U.S.C. 154(b) by 0 days.

(21) Appl. No.: 12/315,032

(22) Filed: Nov. 26, 2008

(65) Prior Publication Data

US 2009/0084877 A1    Apr. 2, 2009

Related U.S. Application Data

(62) Division of application No. 10/531,815, filed on Jul. 6, 2005, now Pat. No. 7,472,851.

(51) Int. Cl.
*B02C 13/286* (2006.01)
(52) U.S. Cl. ....................................... 241/301
(58) Field of Classification Search ...... 241/1, 241/5, 301
See application file for complete search history.

(56) References Cited

U.S. PATENT DOCUMENTS

| | | | |
|---|---|---|---|
| 2,338,373 A | 1/1944 | Aurig | |
| 3,894,695 A * | 7/1975 | Benedikter | 241/55 |
| 4,269,363 A | 5/1981 | Entzmann | |
| 4,406,409 A | 9/1983 | Durek | |
| 4,479,816 A * | 10/1984 | Ganter | 96/282 |
| 4,522,342 A | 6/1985 | Mueschenborn et al. | |
| 5,597,127 A * | 1/1997 | Brown | 241/188.2 |

FOREIGN PATENT DOCUMENTS

| | | |
|---|---|---|
| DE | 1 236 915 | 3/1967 |
| DE | 117 437 | 1/1976 |
| DE | 28 27 944 | 4/1979 |
| DE | 30 34 849 | 4/1982 |
| DE | 195 48 645 | 6/1997 |
| EP | 0 470 948 | 2/1992 |
| EP | 0 949 217 | 10/1999 |
| WO | WO-97/38949 | 10/1997 |
| WO | WO-99/06150 | 2/1999 |

* cited by examiner

*Primary Examiner*—Faye Francis
(74) *Attorney, Agent, or Firm*—Jordan and Hamburg LLP

(57) ABSTRACT

A method for the disintegration and tribochemical activation of especially inorganic materials having a crystalline structure, wherein the starting materials are comminuted (disintegrated) to a particle size of less than 1 μm by the effect of impacting pressure fronts at a pulse duration of less that 10 μs and a sequence frequency of more than 8 kHz. A conglomerate of activated mixed crystals is then obtained having an increased aptitude for the formation of modified crystals when water is added. The duration of the effect of the impacting pressure fronts continues until the crystal lattice structure of the particles is destroyed. A device for the disintegration and tribochemical activation of said materials is based on rotating disks whereon molded bodies with aerodynamic profiles are arranged, the molded bodies being continuously displaced in a transonic speed range and impacting pressure fronts being produced on the outflow surfaces thereof.

15 Claims, 4 Drawing Sheets

METHOD AND DEVICE FOR THE DISINTEGRATION OF ESPECIALLY INORGANIC MATERIALS

Figure 1A:
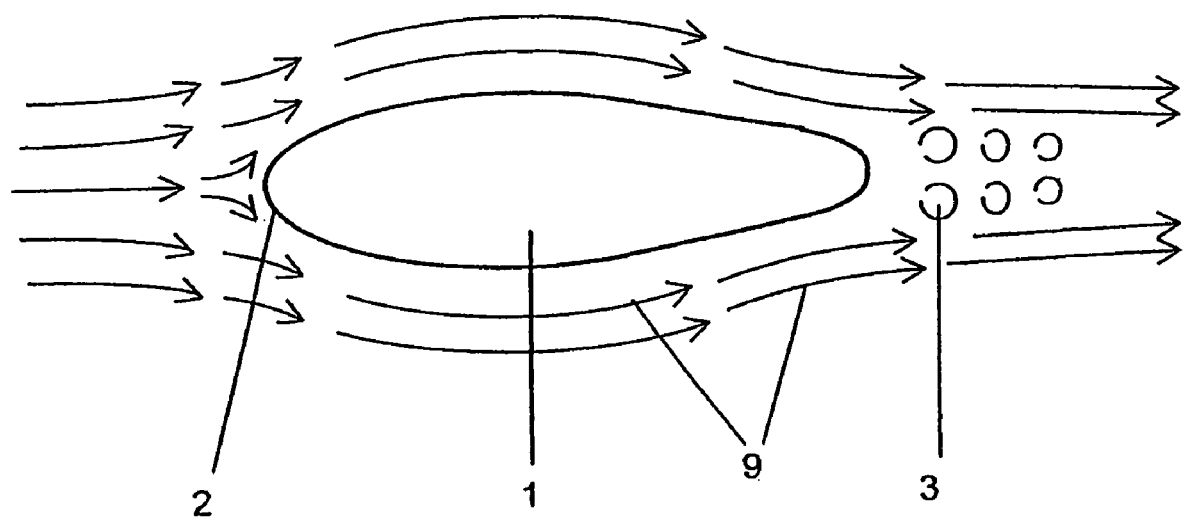
Figure 1B:
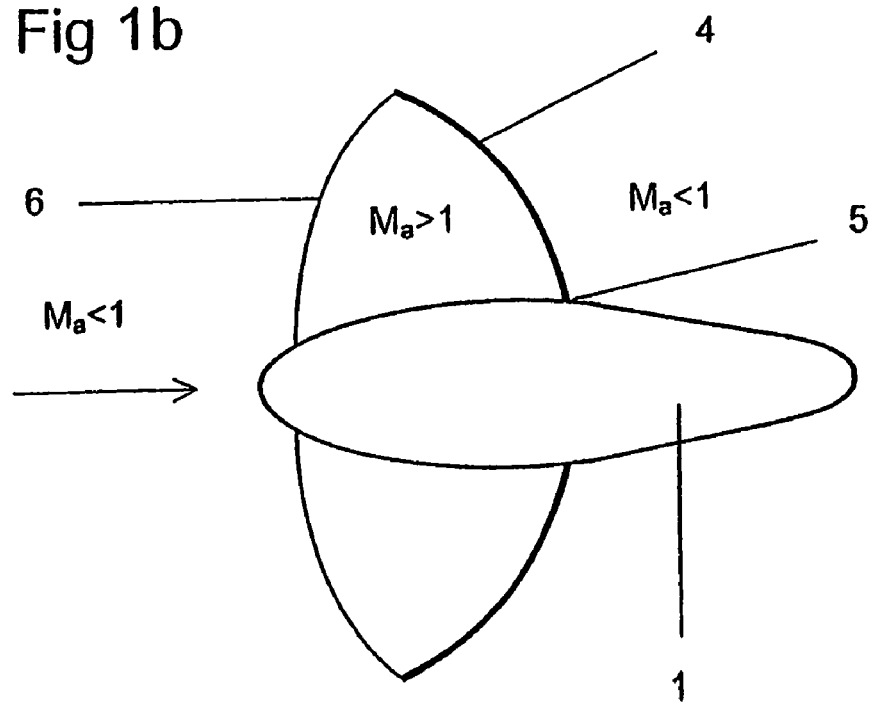
Figure 2:
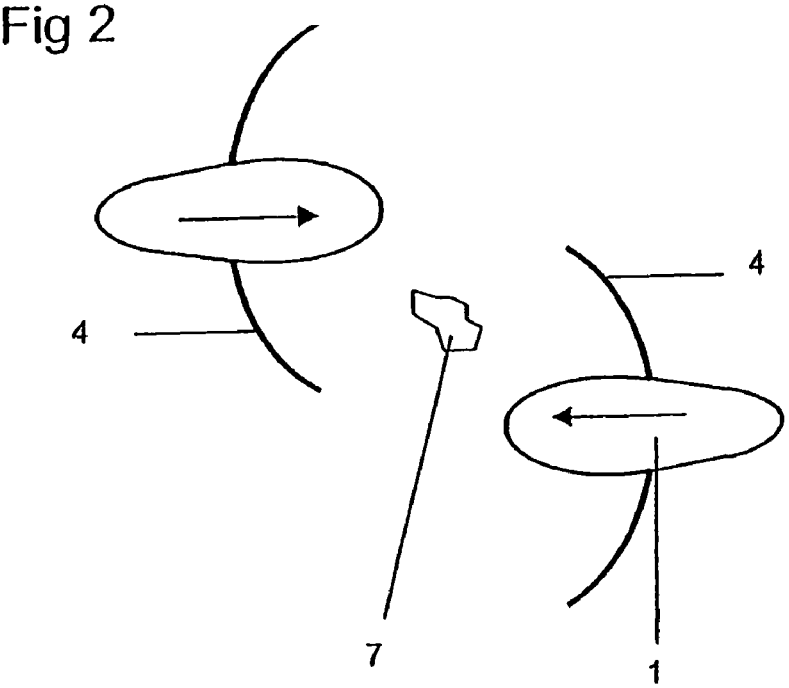
Figure 3:
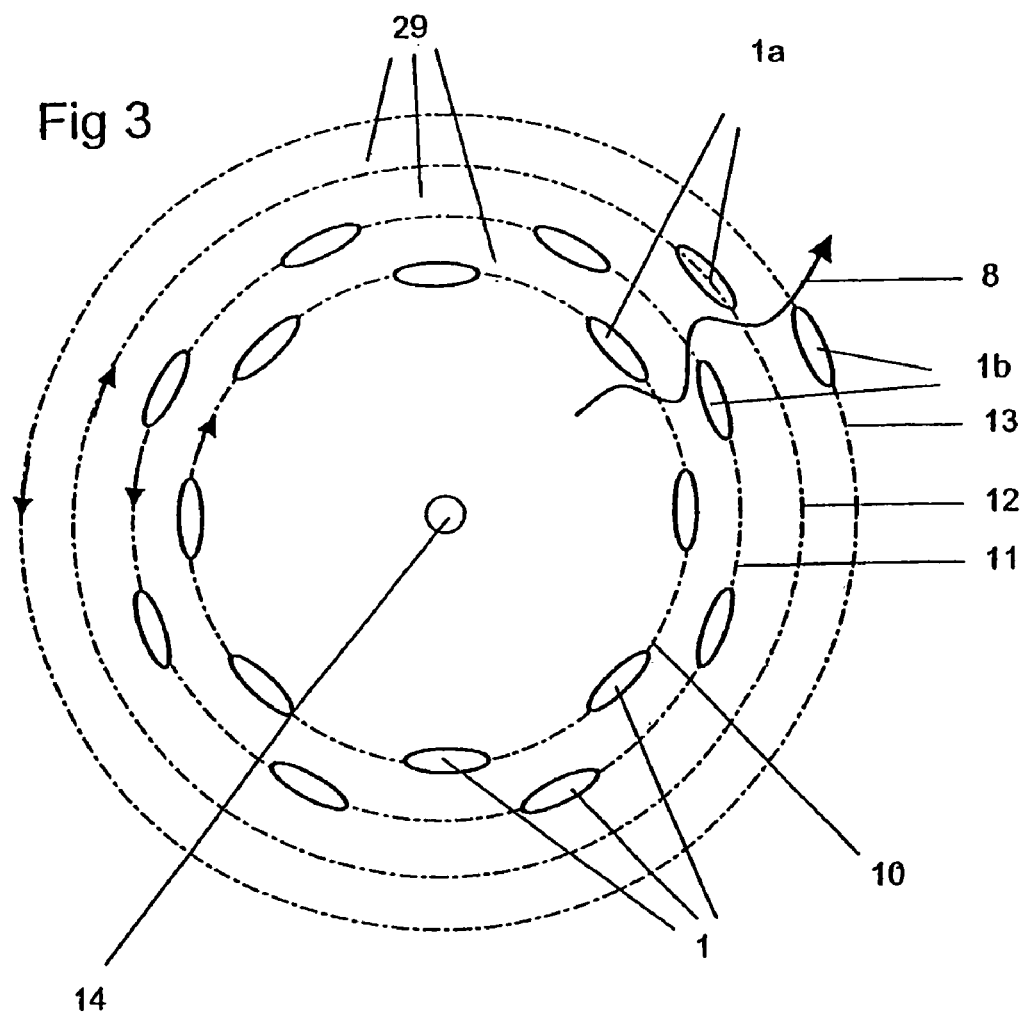
Figure 4:
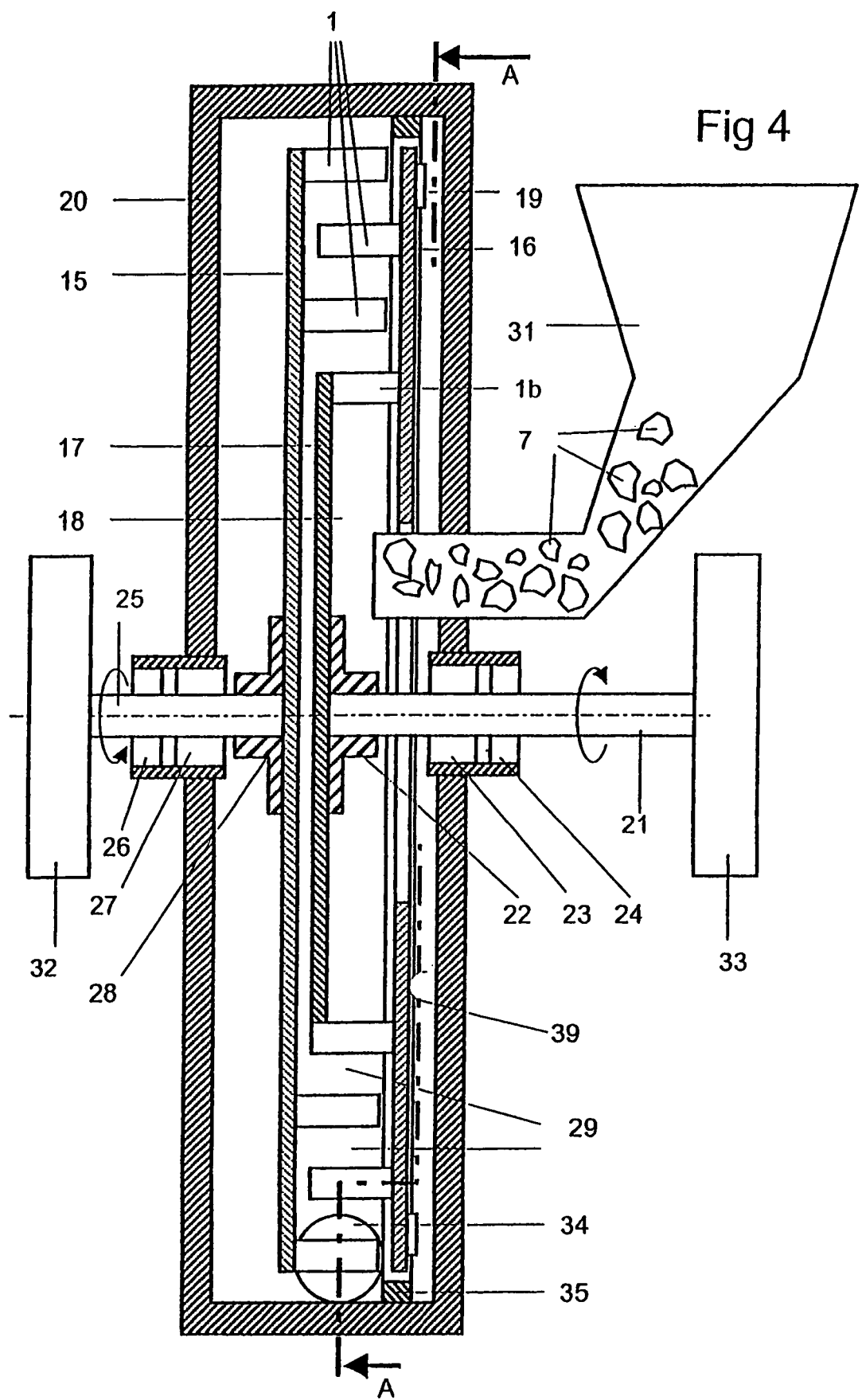
Figure 5:
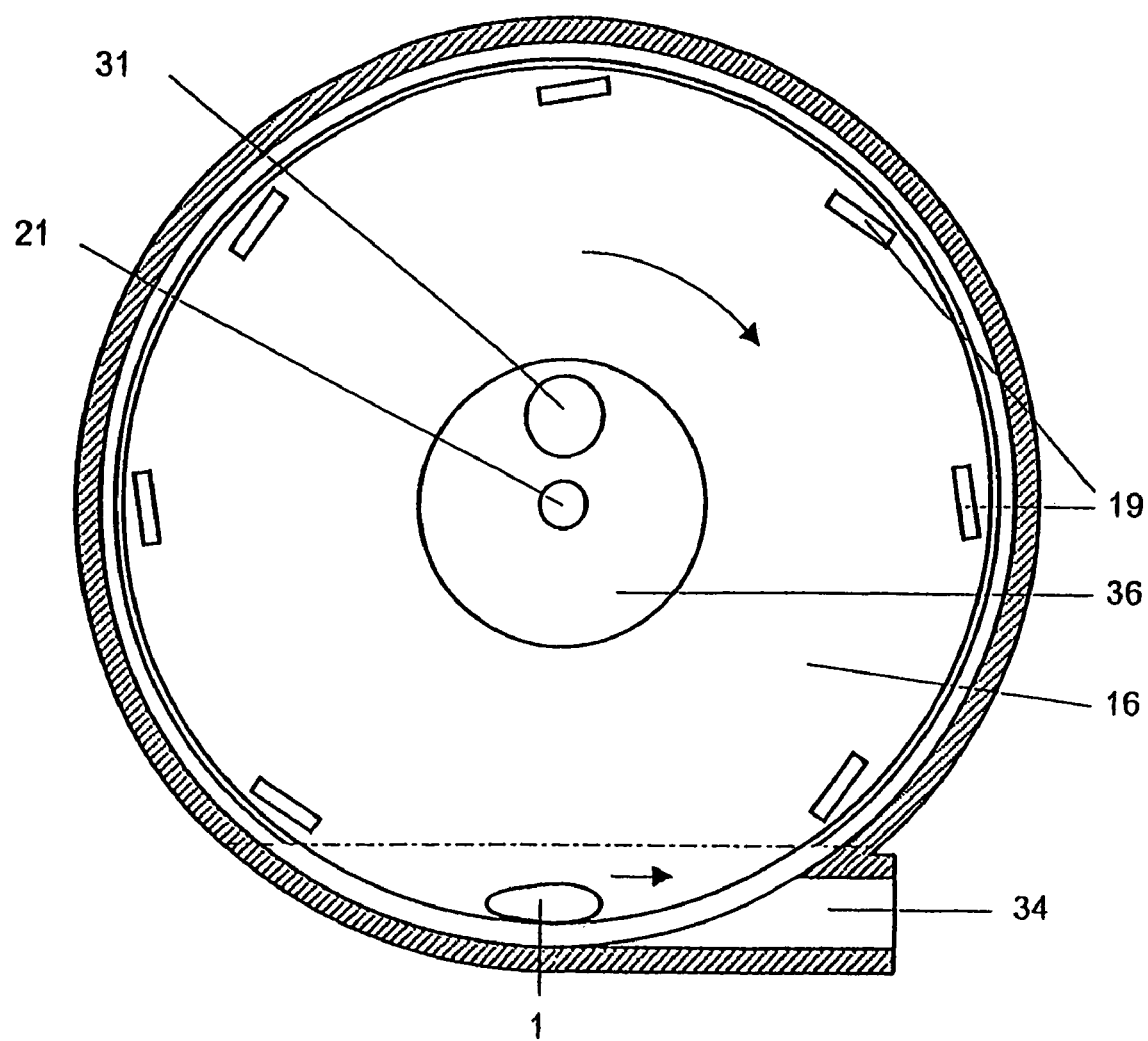
Figure 5:
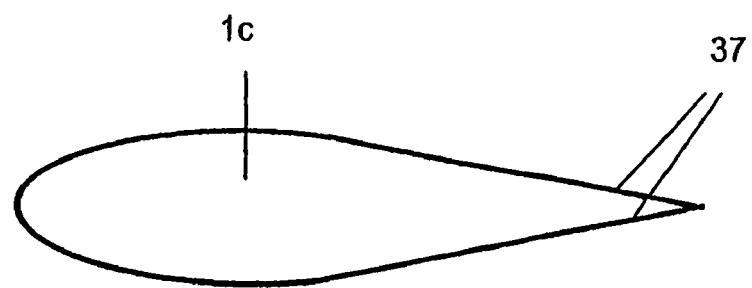

This application is the division of Ser. No. 10/531,815 filed Jul. 6, 2005, now U.S. Pat. No. 7,472,851.

BACKGROUND OF THE INVENTION

The invention relates to a method and an apparatus for the disintegration and tribochemical activation in particular of inorganic materials.

Disintegrators are known for a number of applications. In cement production, for instance, on the industrial scale, chunks of limestone and various additives are first comminuted, then heated to temperatures of 1400° C. to 1600° C., sintered, and then ground to the desired grain sizes. The disadvantage of this method is that a large amount of energy is needed for activating the starting materials.

Known from DE 195 48 645 is attaining an elevated potential energy content and thus increased chemical reactability using tribochemically treated crystals. For instance, mechanical activation of cement facilitates a substantial increase in the strength of the hydrated mineral bonding agent. The reasons for this are the primary particle size and the lattice distortions of these particles.

A plurality of processing methods are available for tribometric processing of starting materials such as e.g. grinding by stressing between two surfaces, or using collisions between freely mobile particles and solid surfaces or collisions among the particles themselves. So-called disintegrators are used for inserting high potential energy into the smallest of particles on a scale of a few μm and for thus causing lattice distortions. The construction principle is characterized by two pin rings or ring gears. In one variant, as described in DE-AS 12 36 915, the particles are comminuted in collisions with pins or teeth. At least three collisions with pins at intervals of no more than 50 ms at a relative speed of at least 15 m/s are required for adequate activation. In this arrangement it is disadvantageous that the wear on the pins is very high, especially when using very hard starting materials.

In another variant, for example, in accordance with DE 30 34 849 A1, the starting material is primarily comminuted using particle collisions in vortices, the vortices being generated by specially shaped blade rings driven in opposite directions. At the same time wear is substantially reduced on the edges of the blade rings or ring gears that are impacted.

The activation that can be attained with known disintegrators or mills is not adequate for developing novel inorganic bonding agents. Particularly when there are small, lightweight particles such as occur after brief milling, it is not possible to cause these particles to collide at a high relative speed of for instance greater than 100 m/s by embedding these particles in a stream of air or in an air vortex.

The object of the invention is to provide a method and an apparatus for disintegration in which dynamic treatment of the particles occurs with substantially increased energies and rates of effectiveness compared to the prior art.

SUMMARY OF THE INVENTION

This object of the invention is attained using a disintegrator of the generic type indicated in the foregoing in which the starting materials in the form of a granulate are subjected to impact pressure waves from a broad frequency spectrum and a pulse duration of less than 10 μs. Further comminution of the particles, destroying the crystal lattice structure, occurs due to the effect of the impact pressure waves striking the particles in quick succession at supersonic speed. As a result of this comminution, a conglomerate of mixed crystals occurs that has an increased capacity for crystal formation when water is added later. The impact pressure waves are generated by shaped bodies with aerodynamically shaped profiles and surfaces that are accelerated to the so-called transonic range. With these, impact pressure fronts are generated that pulverize the granulate introduced into the disintegrator to the desired particle size. The shaped bodies move on disks just below supersonic speed. Because of the effect of high mechanical energy, in addition to being comminuted, the particles are activated and thus undergo a change in chemical properties.

In the case of organic substances, pretreatment is required for the purpose of reducing elasticity.

If the relative speed of the air flowing against the shaped bodies, including the particles suspended in the air, is now just below sound velocity, the flow speed can in part reach supersonic speed relative to the shaped body. The speed range below sound velocity at which the air flowing around the formed bodies in part has supersonic speed is called the transonic speed range in the literature (Sigloch: Technische Fluidmechanik, VDI Publishing, 1996).

Appropriate protective gases can be employed instead of air for avoiding chemical reactions.

Depending on the shape of the aerodynamically shaped body, the transonic speed range commences at 0.75 . . . 0.85 Mach and terminates when the shaped body attains sound velocity with regard to the air flowing against it.

If the speed of the air flowing against it relative to the shaped body is in the transonic speed range, supersonic speed relative to the aerodynamic profile of the shaped body occurs in a zone. This zone of air flowing supersonically relative to the shaped body is limited by a forward front, a rear front, and the profile of the shaped body. A transition from supersonic speed to normal speed takes place on the rear front. This transition is accompanied by an impact pressure front, i.e. the air pressure rises to a multiple of normal pressure and then returns to normal pressure after a brief low pressure phase. The special characteristic of this impact pressure front is that the change in pressure is theoretically limited to a few molecule lengths, but in practice it is on the magnitude of 100 μm due to heating and vortices, and in any case is very short with respect to the geometry of the shaped bodies.

These effects are adequately known in the development of support surface profiles for supersonic aircraft and are undesired. The impact pressure front severely stresses the exterior skin of the wings. In addition, the compression of the air into an impact pressure front requires increased propulsion energy for the aircraft. There is therefore an attempt to moderate the effects of the transonic speed range and to overcome this range rapidly ("break the sound barrier") by specially designing the support surface profiles.

In accordance with the invention, the effects of the transonic speed range are used for the comminution and activation of mineral granulate. The use of the impact pressure front is very efficient due to two factors. First, the impact pressure front is a very brief pulse with a build-up time of a few is. Second, the immediate succession of pressure increase and pressure decrease is very effective in terms of mechanically stressing the granulate. In terms of spectrum, the pressure impact can be understood as the sum of pressure waves of very different frequencies. Thus, depending on the steepness of the pressure impact, frequency portions of pressure waves with a few 100 kHz are also included. Therefore portions of a characteristic breaking frequency that is particularly effective in the direction of the desired comminution and activation occur for different particle sizes and consistency.

The inventive structure of the disintegrator thus subjects the granulate, that is, the particles, to several hundred of these impact pressure fronts successively. This is initially attained by using a plurality of shaped bodies that rotate about a common axis. In addition, a counter-rotating group of shaped bodies prevents the relative speed of the shaped bodies from being reduced with respect to the air with the embedded granulate, that is, particles, due to pulling effects. Thus the particles move relatively slowly, relative to sound velocity, through the disintegration space due to alternating pulling of the particles in the one or other direction.

The repetition rate of the impact pressure fronts is in the supersonic range, are inaudible, and can be dampened relatively well to protect operators.

When the forward surfaces of the shaped body are designed suitably, the particles seldom collide with the shaped bodies because in particular smaller particles are pulled around the surface of the shaped bodies. It is not necessary to provide special armoring or protection of the forward surfaces of the shaped bodies. It is only on the outlet side, that is, in the rear area relative to the flow, that higher loads occur at the point of intersection between the impact pressure front and the surface of the shaped body, and these loads can be supported by suitable materials such as high-alloy tool steels. It is useful to design the surface of the shaped body as a so-called sub-critical profile, that is, the flow around it is largely laminar (Sigloch: Technische Fluidmechanik; VDI Publishing, 1996). The shaped body is for instance rounded on the forward front and its off-flow surfaces meet at an acute angle.

The invention is described in greater detail in the following using an exemplary embodiment with reference to drawings.

BRIEF DESCRIPTION OF THE DRAWINGS

FIG. 1*a* illustrates the profile of the shaped body, with the flow going around it in the sub-sonic range;

FIG. 1*b* illustrates the position of the supersonic range relative to a shaped body that is in an air flow in the transonic range;

FIG. 2 illustrates the alternating effect of impact pressure fronts on a particle;

FIG. 3 illustrates the arrangement of shaped bodies moving in opposition to one another;

FIG. 4 is a section through the disintegration apparatus;

FIG. 5 illustrates a side view of the disintegrator along the line A-A in accordance with FIG. 4; and FIG. 6 is a section of shaped body.

DETAILED DESCRIPTION OF THE INVENTION

FIG. 1*a* illustrates a typically shaped body 1 together with flow lines 9 in the subsonic range. The flow lines 9 initially flow in a laminar manner around the profile of the shaped body 1, whereby, depending on the profile of the shaped body 1, the laminar flow can tear away in the rear area of the shaped body 1 and turbulences 3 can occur.

FIG. 1*b* illustrates the speeds in the so-called transonic speed range. Relative to the surface of the shaped body 1, a zone forms in which the relative speed of the flowing air in part attains sound velocity. The region is labeled "M.sub.a>1" in FIG. 1*b*. The region is limited in the rear by an impact pressure front 4 with a brief increase in pressure and subsequent drop in pressure. The point 5 marks the location of particular mechanical stress to the surface of the shaped body 1, and a limit of the transonic area is identified by reference numeral 6.

FIG. 2 illustrates the effect of the impact pressure fronts 4 on a granulate 7. The granulate 7 passes through an impact pressure front 4 twice, alternating in a different direction.

FIG. 3 illustrates the arrangement of the shaped bodies 1 relative to one another. For instance, two groups of shaped bodies 1*a* and 1*b* are illustrated that rotate clockwise or counterclockwise about the axle 14. In the exemplary embodiment, each group contains 16 shaped bodies that rotate about the axle 14 at a rotational frequency of 500 rotations/second. Given a radius of 100 mm, this results in a relative speed of approx. 315 meters/second, i.e. approx. 95% of sound velocity. The sequence of the impact pressure fronts 4, without taking into consideration the opposing group, is 8 kHz. The particle path 8 in the disintegration space 29 is illustrated schematically in FIG. 3.

FIG. 4 illustrates a section of an inventive disintegrator. The shaped bodies 1 of the first group 1*a* are affixed to a disk A 15. Two groups per direction of rotation are used in the exemplary embodiment. The disk A 15 is itself affixed to a hub A 28 on an axle 25, which is caused to rotate at the necessary minimum speed by a drive motor 32. The axle 25 is borne in a housing 20 via a bearing A 26. A shaft seal A 27 prevents particles 30 and impurities from exiting the bearing A 26. The second group of shaped bodies 1*b* is affixed to a disk B 16. This disk B 16 is securely joined to a disk B1 17 and an axle B 21, whereby the axle B 21 itself is borne in the housing 20 via a bearing B 24. The second group of shaped bodies 1*b* is driven by a motor B 33 against the direction of rotation of the drive motor A 32.

The granulate 7 is added via the filling hopper 31 near the center of the disintegrator to the filling chamber 18. Here the granulate 7 travels into the area of the impact pressure fronts 4 and is pulverized on the way to the exterior areas.

In the design of the inventive disintegrator it should be noted that the disks 15 and 16 rotating at great speed and the shaped bodies 1 affixed thereto pull air along with them, and this air is driven outward by centrifugal forces. While in the disintegration space 29 a continuous change occurs in the rotational speed and thus the speed of the particles 30 is decelerated again and again, the centrifugal force for the two exterior surfaces 38 and 39 of the two disks 15 and 16 remains unchanged. In particular for the disk B 16, through which passes the filling hopper 31, the centrifugally accelerated air can lead to undesired suction of the granulate 7 out of the filling hopper 31 at the external surface 39 of the disk B 16 and granulate 7 can be conveyed directly to the outlet 34, circumventing the effects of the shaped bodies 1. This effect can be corrected when the exterior surface 39 of the disk B 16 is relatively well sealed against the housing 20 by a sealing ring 35. Another solution for this problem is to arrange scoops 19 on the exterior surface 39 of the disk B 16; these then counteract the centrifugal force using an opposing air flow.

After passing through the disintegrator space 29, the particles are removed at the outlet 34, as can be seen in FIG. 5.

It has been demonstrated that having the granulate 7 pass through the disintegrator just one time is adequate in terms of the desired comminution and activation. The described apparatus works continuously. As much granulate 7 as can be added to the filling chamber 18 based on the geometry of the filling hopper 31 becomes fully prepared powder made of particles 30 at the outlet 34.

FIG. 6 illustrates one particularly advantageous embodiment of the shaped bodies 1. The pointed shape of the outflow surfaces 37 prevents vertices and thus reduces the drive energy required.

LEGEND

1 Shaped body
2 Tip of shaped body
3 Turbulences
4 Impact pressure front
5 Initial point of impact pressure front
6 Limit of transonic area
7 Granulate
8 Particle path
9 Flow lines
10 Interior radius of shaped body path of disk 16
11 Interior radius of shaped body path of disk 15
12 Exterior radius of shaped body path of disk 16
13 Exterior radius of shaped body path of disk 15
14 Axis of rotation
15 Disk A
16 Disk B
17 Disk B1
18 Filling chamber
19 Scoops
20 Housing
21 Shaft B
22 HubB
23 Shaft sealing ring B
24 Bearing B
25 Shaft A
26 Bearing A
27 Shaft sealing ring A
28 HubA
29 Disintegration space
30 Particle
31 Filling hopper
32 Motor A
33 Motor B
34 Outlet
35 Sealing ring
36 Inlet opening
37 Outflow surfaces
38 Exterior surface of disk A
39 Exterior surface of disk B

What is claimed is:

1. An apparatus for disintegration and tribochemical activation of a material, comprising:
    a rotatable disk;
    shaped bodies arranged on said disk, each of said shaped bodies presenting an aerodynamically formed profile which is rounded at a leading edge of each of said shaped bodies in a direction of rotation and including outflow surfaces converging at an acute angle;
    a supply for the material to be disintegrated having an outlet arranged adjacently proximate to a center of the apparatus;
    an external outlet for the material following disintegration; and
    a drive for imparting rotation to said disk, said drive being configured to rotate the disk at a rotational speed such that the shaped bodies move at a speed just below the speed of sound and a fraction of air flowing around the shaped bodies has a supersonic speed, said fraction being delimited on a back side of said each of said shaped bodies by an impact pressure front.

2. The apparatus according to claim 1, wherein said material includes at least one inorganic material.

3. The apparatus according to claim 1, said drive being configured to rotate the disk at said rotational speed which is such that a relative speed of the air impinging on the shaped bodies amounts to at least 0.75 to 0.85 Mach dependent on the configuration of the aerodynamically formed shaped bodies.

4. The apparatus according to claim 1, wherein said shaped bodies are arranged in such a manner that a selected number of said shaped bodies in combination with the rotational speed of the disk results in a repetition frequency of the impact fronts of over 8 kHz.

5. The apparatus according to claim 1, wherein an outer envelope of each of the shaped bodies is in a form of a sub-critical profile configured such that air flow therearound is substantially laminar.

6. The apparatus according to claim 1, wherein said aerodynamically formed profile is generally bilaterally symmetric about a central axis, said central axis being approximately aligned with a circumferential travel path of said shaped bodies when rotated.

7. An apparatus for disintegration and tribochemical activation of a material, comprising:
    a first rotatable disk and a second rotatable disk;
    shaped bodies arranged on said first and second disks, each of said shaped bodies presenting an aerodynamically formed profile which is rounded at a leading edge of each of said shaped bodies in a direction of rotation and including outflow surfaces converging at an acute angle;
    a supply for the material to be disintegrated having an outlet arranged adjacently proximate to a center of the apparatus;
    an external outlet for the material following disintegration; and
    a first drive and a second drive for imparting rotation respectively to said first disk and said second disk in opposing directions, each of said first and second drives being configured to rotate each of the first and second disks at a rotational speed such that the shaped bodies move at a speed just below the speed of sound and a fraction of air flowing around the shaped bodies has a supersonic speed, said fraction being delimited on a back side of said each of said shaped bodies by an impact pressure front.

8. The apparatus according to claim 7, wherein each of said first and second disks is fitted with two groups of said shaped bodies.

9. The apparatus according to claim 7, wherein said material includes at least one inorganic material.

10. The apparatus according to claim 7, wherein said shaped bodies are arranged in such a manner that a selected number of said shaped bodies in combination with the rotational speed of the disk results in a repetition frequency of the impact fronts of over 8 kHz.

11. The apparatus according to claim 7, wherein an outer envelope of each of the shaped bodies is in a form of a sub-critical profile configured such that air flow therearound is substantially laminar.

12. The apparatus according to claim 7, wherein said aerodynamically formed profile is generally bilaterally symmetric about a central axis, said central axis being approximately aligned with a circumferential travel path of said shaped bodies when rotated.

13. An apparatus for disintegration and tribochemical activation of a material, comprising:
    a rotatable disk;

shaped bodies arranged on said disk, each of said shaped bodies presenting an aerodynamically formed profile which is rounded at a leading edge of each of said shaped bodies in a direction of rotation and including convergent outflow surfaces away from said direction of rotation;

a supply for the material to be disintegrated having an outlet arranged adjacently proximate to a center of the apparatus;

an external outlet for the material following disintegration; and a drive for imparting rotation to said disk, said drive being configured to rotate the disk at a rotational speed such that the shaped bodies move at a speed just below the speed of sound and a fraction of air flowing around the shaped bodies has a supersonic speed, said fraction being delimited on a back side of said each of said shaped bodies by an impact pressure front.

14. The apparatus according to claim 13, further comprising:

a second rotatable disk; and a second drive for imparting rotation to said disk in a rotational direction opposite to a corresponding rotational direction of said disk.

15. The apparatus according to claim 13, wherein said aerodynamically formed profile is generally bilaterally symmetric about a central axis, said central axis being approximately aligned with a circumferential travel path of said shaped bodies when rotated.

* * * * *